(12) United States Patent
Doany

(10) Patent No.: US 6,377,203 B1
(45) Date of Patent: Apr. 23, 2002

(54) COLLISION ARBITRATION METHOD AND APPARATUS FOR READING MULTIPLE RADIO FREQUENCY IDENTIFICATION TAGS

(75) Inventor: Ziyad Hanna Doany, Autsin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/496,227

(22) Filed: Feb. 1, 2000

(51) Int. Cl.[7] .............................................. G01S 13/74
(52) U.S. Cl. .......................... 342/44; 342/42; 340/10.1; 340/10.4; 340/10.42; 340/870.01; 340/870.02; 340/870.03; 340/870.11
(58) Field of Search .... 342/42–51; 340/870.01–870.17, 340/505, 10.1–10.52

(56) References Cited

U.S. PATENT DOCUMENTS

| | | |
|---|---|---|
| 3,860,922 A | 1/1975 | Wagner |
| 4,471,345 A | 9/1984 | Barrett, Jr. |
| 5,041,826 A | 8/1991 | Milheiser |
| 5,266,925 A | 11/1993 | Vercellotti et al. |
| 5,302,954 A | 4/1994 | Brooks et al. ................. 342/44 |
| 5,349,355 A | 9/1994 | Longas et al. ................. 342/42 |
| 5,500,651 A | 3/1996 | Schuermann ................. 342/42 |
| 5,515,053 A | 5/1996 | Hecht et al. ................... 342/42 |
| 5,521,601 A | 5/1996 | Kandlur et al. ............... 342/44 |
| 5,539,394 A | 7/1996 | Cato et al. |
| 5,550,547 A | 8/1996 | Chan et al. .................... 342/42 |
| 5,591,951 A | 1/1997 | Doty |
| 5,606,322 A | 2/1997 | Allen et al. |
| 5,625,341 A | 4/1997 | Giles et al. |
| 5,673,037 A | 9/1997 | Cesar et al. |
| 5,821,877 A | 10/1998 | Fallah |
| 5,986,570 A * | 11/1999 | Black et al. ................. 340/10.2 |
| 6,091,319 A * | 7/2000 | Black et al. ................. 340/10.2 |
| 6,265,962 B1 * | 7/2001 | Black et al. ................. 3400/10.2 |

FOREIGN PATENT DOCUMENTS

| | | |
|---|---|---|
| EP | 0 467 036 A2 | 1/1992 |
| EP | 0 467 036 B1 | 1/1992 |
| GB | 1310679 | 3/1973 |
| GB | 2034558 A | 6/1980 |
| GB | 1602954 | 11/1981 |
| GB | 2182816 A | 5/1987 |
| GB | 2259227 B | 3/1993 |
| WO | WO 98/27441 | 6/1998 |
| WO | WO 98/35327 | 8/1998 |

* cited by examiner

Primary Examiner—Bernarr E. Gregory
(74) Attorney, Agent, or Firm—Nestor F. Ho; Darla P. Fonseca

(57) ABSTRACT

A method for simultaneously reading a serial number and/or other information from multiple colliding RF signals from RF identification tags requires minimal additional logic in the tag's processor and provides for a powerful and rapid sorting and identification scheme. This technique employs a primary communication channel and multiple secondary channels. A locator or reader unit interrogates the tags, which respond with an RF signal. Upon receiving multiple signals, the locator or reader unit commands the RFID tags and requires them to transmit another response, which is transmitted in one of the secondary channels based on a portion of their unique serial identification number, thereby forcing the tags to sort in the secondary channels. These secondary channels are assigned using a portion of the unique serial identification numbers for the tags. The reader then detects an acknowledgment in the occupied secondary channels and commands a tag in a particular channel to move to the primary channel. Once the signal is transmitted in the primary channel, the reader reads the identification number. If there is further collision, the collided tags are returned to the secondary channel and sorted again using a different portion of their ID number. This process continues until all the tags are sorted and identified. Once the tags are all sorted, the tags are assigned yet another channel distinct from the secondary channels that are used for sorting.

11 Claims, 4 Drawing Sheets

COLLISION ARBITRATION METHOD AND APPARATUS FOR READING MULTIPLE RADIO FREQUENCY IDENTIFICATION TAGS

BACKGROUND OF THE INVENTION

The present invention relates generally to methods and apparatuses for arbitrating collisions due to simultaneously received data transmissions, and more particularly to a method and apparatus for arbitrating collisions due to simultaneously received data transmissions from multiple sensors.

RF identification tags are used in many applications, including but not limited to personnel identification, utility line markers, object tracking, etc. When communicating via wireless means (or a common bus), it is necessary to arbitrate a potential collision or contention that may arise from reading multiple units simultaneously. Each of these systems requires a main transmitting/receiving unit to distinguish from potentially multiple tags. Receiving multiple transmissions simultaneously requires the main transmitting/receiving unit to sort the transmission collisions using multiple re-interrogations (i.e., transmissions) and further process the received signals.

Utility lines are often marked with buried markers to help identify their locations. These buried markers can be detected using a radio frequency (RF) transmitter that interrogates the markers, which in turn transmit a reply signal. As the markers are buried relatively close to one another, the interrogating transmitter will often receive multiple signals simultaneously. When two signals are received simultaneously, this is known as a "collision". Techniques for processing the received signals to avoid these collisions have been developed.

A basic concept in anti-collision transmitting/receiving systems is to design the system so that only one transmitter (e.g., a marker) responds at a time, thereby enabling the interrogating receiver to read a serial number of the replying transmitter without interference from other simultaneously transmitted signals. Signals that occupy the same time-frequency space create noise for a receiver attempting to receive the signals. Moreover, a similar signal having similar modulation and data rates creates coherent noise, in the presence of which it is particularly difficult to receive another signal.

Several techniques have been implemented in an attempt to overcome these problems. One technique assigns a unique time slot for each returning signal. This is known as time division multiple access (TDMA). This technique requires a large time slot for systems involving many possible signals. Employing this technique to avoid collisions in utility marker transmission/receiving system requires many assigned time slots, as the transmitter may not know which markers it will be interrogating in advance. Consequently, this technique becomes impractical in systems where many potential transmitters exist.

Another technique employs frequency division. In this protocol, called Frequency Division Multiple Access (FDMA), each signal is assigned a unique frequency. As with TDMA, FDMA requires many assigned frequencies, thereby making it impractical for use in interrogating utility markers given the large number of potential markers being interrogated.

Another technique employs code division. In this protocol, called Code Division Multiple Access (CDMA), each signal uses different code key. This technique suffers from the same disabilities as TDMA and FDMA for use in utility marking systems.

Another technique combines aspects of code division and time division. One example of such a technique is set forth in UK Patent GB 2 259 227, which discloses a combined TDMA/CDMA technique for processing multiple signals. Another example is set forth in U.S. Pat. No. 5,606,322 (Allen et al.), which discloses a method and apparatus for generating a pseudo-random code for use in avoiding RF collisions. However, this simply reduces the number of potential collisions, but does not solve the problem for large numbers of potential transmitters.

Another technique uses a random delay and code/frequency division. These techniques require a complex processor to generate the random delay. Moreover, collisions are still possible in such a system.

U.S. Pat. No. 4,471,345 (Barrett, Jr.) discloses a randomized tag to portal communication system. In this system, communication between portal units and identification tags is accomplished by continually radiating an interrogation signal consisting of a code pattern from each portal unit followed by a listening interval. Tags within range of such interrogation signal test the incoming signals for frequency, bit duration, bit rate, a preamble code and a facility identifying code. If the tag receives a valid signal to which it has been preprogrammed, such signal synchronizes and initiates a plurality of tag responses within a given overall response interval and with each response transmitted during randomly selected time slots.

Another technique broadcasts a signal directed only to specific markers. The one that includes the correct address is the only one that responds. This system requires advance knowledge of potential transmitters, which is not always available in utility marking systems.

U.S. Pat. No. 5,521,601 (Kandlur et al.) discloses a power efficient technique for multiple tag discrimination. This patent provides a tag identification system and method for identifying tags in the range of a reader station where the tags are divided into smaller groups and are identified one group at a time so as to save power by powering off the tags that are not in the group currently being identified. Each tag puts itself in a group by performing calculations from parameters stored in itself and from parameters received from the reader station. This technique requires many transmissions and a complex locator unit.

Another technique sorts by received power, which varies by distance to the receiver. This technique is unduly complex.

U.S. Pat. No. 5,266,925 (Vercellotti et al.) discloses an electronic identification tag interrogation method. In this method, the interrogation signal includes an address, which requests a response from every tag having an address greater than or equal to the address of the signal. If more than one address is received, the interrogation address is bisected and the interrogation signal is retransmitted. The interrogation signal is successively bisected until a single response is isolated.

U.S. Pat. No. 5,550,547 (Chan et al.) discloses a multiple item radio frequency tag identification protocol. This protocol uses a tree splitting algorithm applied to RF tagging. Essentially, using this protocol groups of tags are selected and deselected until no further RF collisions occur. A similar device is disclosed in U.S. Pat. No. 5,521,601, which powers groups on and off until no RF collisions occur. U.S. Pat. No. 5,673,037 also discloses a group selection/deselection technique.

U.S. Pat. No. 5,515,053 (Hecht et al.) discloses a transponder and data communication system in which the interrogating device transmits a coded signal containing wildcard entries in the code. If multiple signals are received, the interrogating device transmits another coded signal, but with fewer wildcards in the code. This process is repeated until only a single signal is received.

U.S. Pat. No. 3,860,922 (Wagner) discloses a device using a time dependent codeword to respond to an interrogation to avoid RF collisions.

PCT Patent Application No. WO 98/35327 discloses a random based non-interrogating technique for avoiding RF collisions from multiple RF tags.

Each of the above techniques are complicated to implement, thus decreasing the reliability of the marker, which is of critical importance for a device expected to last over fifty years. Moreover, the data rate employed in buried markers is relatively slow (approximately 125 Hz) to guarantee proper reception. Therefore, to attempt to assign a unique time slot to all markers requires a significant time delay.

The present invention is therefore directed to the problem of developing a method and apparatus for arbitrating between signals being transmitted from multiple RF identification tags buried along a utility route.

SUMMARY OF THE INVENTION

The present invention solves this problem by providing a primary communications channel and multiple secondary communications channels, such that each of the secondary communications channels is unique relative to the primary communications channel, and by commanding each of the radio-frequency markers to respond in one of the secondary communications channels based on a portion of a number available to each of the radio-frequency markers.

BRIEF DESCRIPTION OF THE DRAWINGS

FIG. 2 depicts channel assignments in an exemplary embodiment of a method of the present invention in a first step.

FIG. 3 depicts channel assignments in an exemplary embodiment of a method of the present invention in a second step.

FIG. 4 depicts channel assignments in an exemplary embodiment of a method of the present invention in a third step.

DETAILED DESCRIPTION

Figure 1:
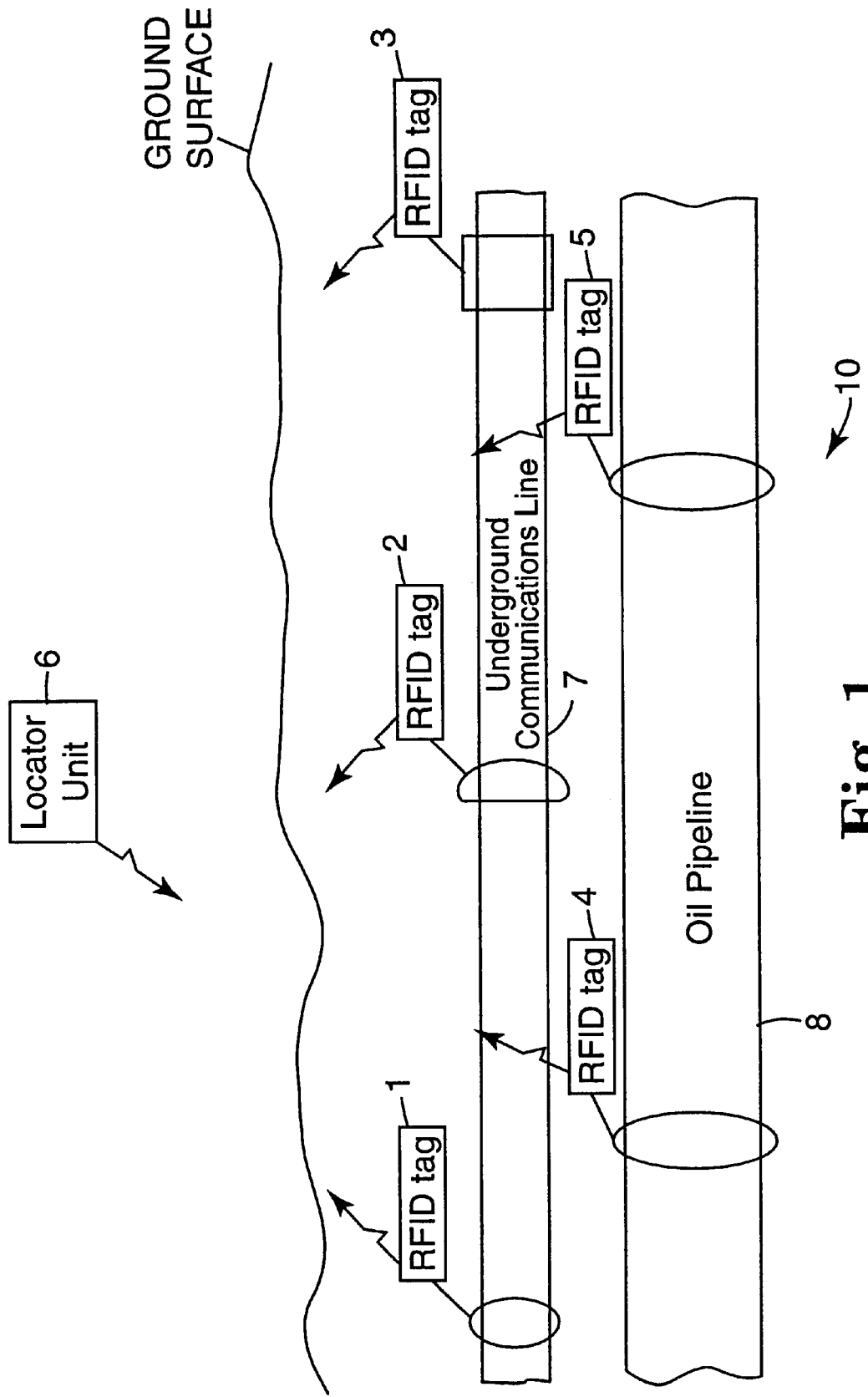
FIG. 1 depicts a block diagram of an exemplary embodiment of a system according to one aspect of the present invention.

The present invention provides a method and a apparatus for simultaneously reading a serial number and/or other information from numerous colliding radio-frequency (RF) electronic markers or identification tags (termed herein RFIDs). While the present invention is particularly suited for the severe environmental constraints applicable to RFID tags applied to utility line marking systems, the present invention is also applicable to other data transmission and receiving systems, including satellite, terrestrial and computer communications involving attempts to receive transmissions from multiple sources simultaneously.

To meet the severe environmental constraints imposed on utility line markers to be deployed for upwards of fifty years, the present invention requires minimal additional logic in the RFID chip, yet provides for a powerful and rapid sorting and identification scheme that quickly identifies and sorts RF collisions.

The present invention employs a combination of a primary communications channel and multiple secondary channels. Each of the secondary channels is assigned its own unique time-slot that is delayed from the primary channel. Other multiplexing schemes are possible rather than time based on a unique channel allocation. For example, frequency, codeword and various combinations of time, frequency and codeword may be used to uniquely specify one of the secondary channels.

In one exemplary embodiment of a channel allocation scheme, let $C_0$ represent the primary communications channel. In this scheme, $C_1$ represents the first of the secondary channels, $C_2$ represents the second of the secondary channels, and so on, and $C_n$ represents the $n^{th}$ secondary channel. Using this notation, the subscript represents the time delay (or channel assignment) relative to the primary communications channel. Therefore, $C_1$ is delayed one time unit from the primary channel, and $C_n$ is delayed 'n'time units from the primary channel. The length of the time unit is selected to enable each RF signal to be successfully received without interference from signals in adjacent time slots, which is tailored to the specifics of the modulation and coding schemes being employed, which are independent of the present invention.

According to one aspect of the present invention, an exemplary embodiment of a method for locating multiple RFID tags operates as follows. First, the locator or reader unit interrogates the RFID tags, which then respond with an RF signal. See FIG. 2, which shows multiple signals (represented by (1)–(4)) being received in the primary communications channel 21.

Figures 2, 3, 4:
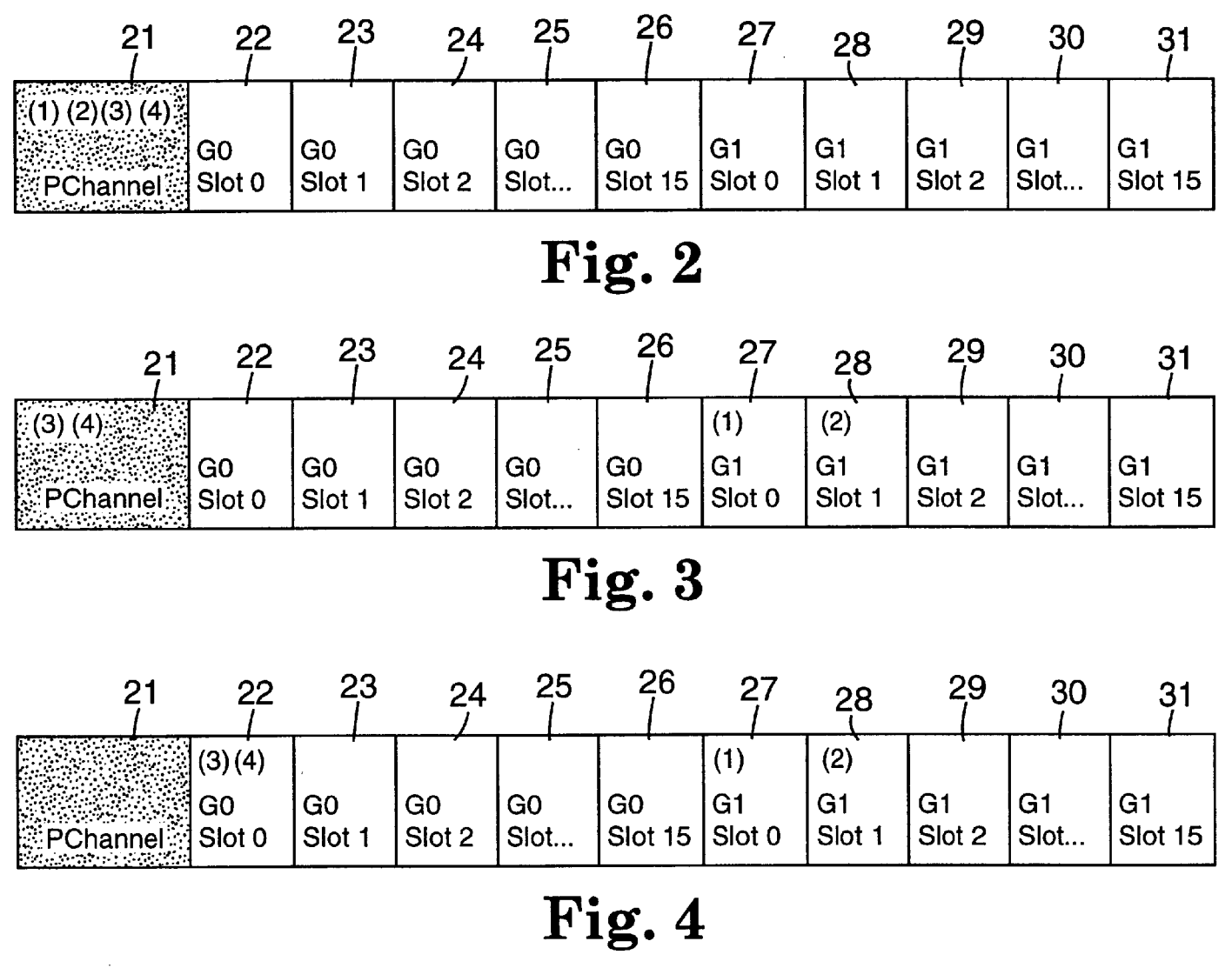

For RFID tags whose signals that can be identified without interference, the locator unit commands these RFID tags to a dedicated group of channels specifically assigned to be used for further communications. We shall call these tertiary channels to provide a distinction between the primary channel, and the secondary channels used for sorting. Refer to FIG. 3, which shows that signals (1) and (2) have been successfully read and their associated RFID tags are now assigned to tertiary channels GI slot "0" 27, and G1 slot "1" 28.

Upon receiving multiple signals that interfere, such as (3) and (4) in FIG. 3, the locator or reader unit commands the RFID tags associated with these signals by sending them to a particular slot of the secondary channels for subsequent sorting. Refer to FIG. 4, which shows signals (3) and (4) are assigned to group G0 slot "0" 22.

Figure 5:
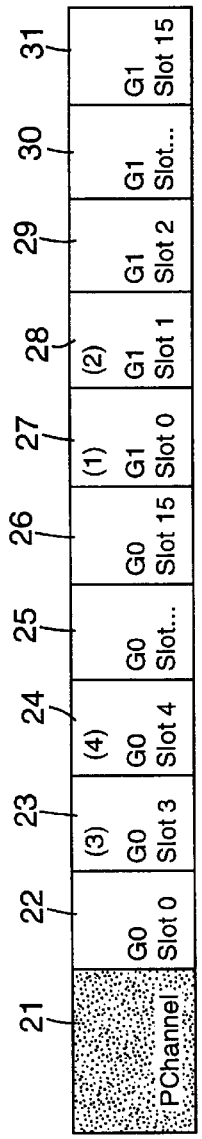
FIG. 5 depicts channel assignments in an exemplary embodiment of a method of the present invention in a fourth step.

Next, each RFID tag is commanded to transmit another response, each of which response is delayed from the primary communications channel 21 based on a portion of a unique number stored in or otherwise available to each RFID tag. One possible embodiment of the unique number includes a combination of one or more of the following: a unique serial number, time of day, utility marking system, sensor data to be transmitted, etc. Refer to FIG. 5, which shows that signals (3) and (4) respond in secondary channels GO slot "3" 23 and GO slot "4" 24, respectively. Commanding the responding RFID tags to other secondary communications channels forces the RFID tags to sort in the secondary communications channels.

An exemplary embodiment of the secondary communications channels consists of a number of time slots (e.g., 16) based on the value of any portion (e.g., a 4-bit portion) of their unique number. As each serial identification number for each tag is potentially unique, there is always a portion of the serial identification number that is different from another marker. Moreover, combining the serial number with other available data/numbers will further guarantee uniqueness of a selected secondary channel.

Figure 6:
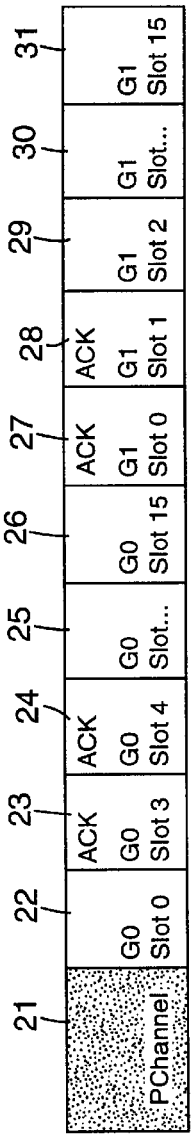
FIG. 6 depicts channel assignments in an exemplary embodiment of a method of the present invention in a fifth step.

The reader then detects an acknowledge (ACK) word in the occupied secondary channels. Refer to FIG. 6, which shows the RFID tags associated with signals (3) and (4) respond to an interrogation with an ACK response in secondary channels GO slot "3" 23 and GO slot "4" 24.

Figure 7:
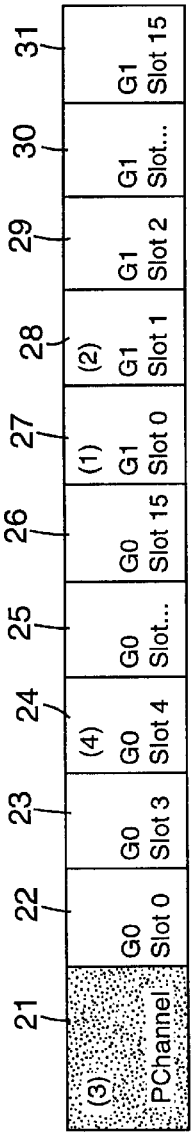
FIG. 7 depicts channel assignments in an exemplary embodiment of a method of the present invention in a sixth step.

Next, the location unit commands a tag in a particular slot or channel to move to the primary channel where there is no delay. Refer to FIG. 7, which shows that the RFID tag associated with signal (3) is now assigned the primary communications channel 21. Once the signal is transmitted in the primary channel 21, the reader reads the identification number. If there is further collision, the collided tags are returned to the secondary channel and sorted again using a different portion of their ID number, i.e., the steps shown in FIGS. 4–6 are repeated. This process continues until all the tags are sorted and identified.

Figure 8:
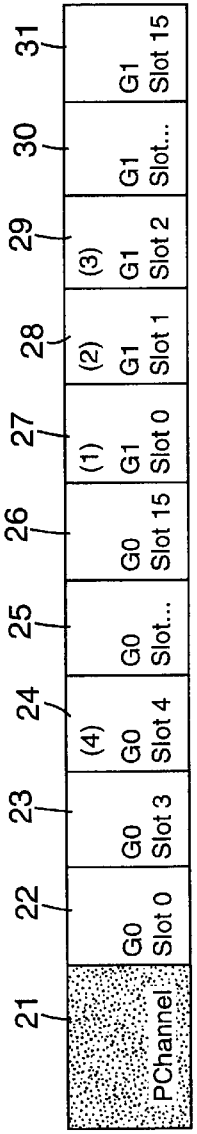
FIG. 8 depicts channel assignments in an exemplary embodiment of a method of the present invention in a seventh step.

Once the RFID tags are all sorted, the RFID tags are assigned yet another time slot outside the secondary channels that are used for sorting, such as the tertiary channels. Refer to FIG. 8, which shows that the RFID tag associated with signal (3) has been assigned tertiary channel GI slot "2". The RFID tag associated with signal (4) is then commanded to move to the primary communications channel 21, and if successfully received, is then moved to a tertiary channel, such as G1 slot "3".

Another aspect of the present invention relates to an application whereby the RFID tags are polled to read information arriving via their serial ports, which information could be coming from a sensor. In this case, after all the detected tags are identified, they are all commanded to switch to the "polling" mode, whereby each is allocated a distinct time slot and only one "read" command is needed to read all the tags (or sensors) sequentially. One example of this is to assign each of the identified tags a tertiary channel, which when polled while assigned to the tertiary channel causes a response of the polled information to the reader.

Exemplary Embodiment

The present invention may be used in any RFID tag or electronic marker product application, where collision may occur between units, which collision needs to be resolved. One application for the present invention is in the Electronic Marking System (EMS) used to mark underground features, such as buried cable splices, loops, pipe valves, Tees or other utility features. The users mark important spots underground using this totally passive device and expect it to last upwards of fifty (50) years.

Adding the identification to the passive marker will allow the user to positively identify a particular marker and tie it to a database, electronic or other, by using the identification number. More information may be stored in the marker integrated circuit that would help identify the facility owner, type of facility (e.g., copper, fiber, etc.). This aspect of the present invention is particularly useful in that often multiple utility lines are buried along common rights-of-way. Consequently, using similar markers for different utility lines may cause confusion when attempting to locate specific markers. Moreover, requiring different utility providers to coordinate types and locations of markers along a common right-of-way is too difficult.

As there is always a finite probability of markers buried at close proximity to each other over the lifetime (e.g., 50 years) of a marker, a method for dealing with "collided" markers is needed. Furthermore, the method used should be guaranteed because the consequences are costly because they involve digging up the marker.

FIG. 1 depicts an exemplary embodiment of a system 10 according to the present invention for use is identifying underground utility lines. As shown therein, RFID tags 1, 2 and 3 mark an underground communications line 7. RFID tags 4 and 5 mark an underground oil pipeline 8.

Each of the RFID tags includes a transceiver (not shown), an antenna (not shown), a processor (not shown), and a power supply (either coupling to a power source on the power/utility line, or a battery, neither of which are shown). In some applications, the RFID is a passive device that uses the power in the transmitted signal to energize the processor and transceiver. Such devices are well-known in the industry and need no further description herein.

The locator unit 6 also includes a transceiver (not shown), antenna (not shown), processor (not shown) and power supply (not shown). To increase the reliability to enable the RFID tags to be employed in underground applications where they may remain for upwards of fifty years, the RFID tag must be made as simple as possible. The message processing technique of the present invention enables a very simple processor to be used.

Locator unit 6 transmits an interrogation signal to all RFID tags in its proximity. RFID tags 1–5 reply, thereby creating RF collisions in the primary communications channel P 21. The RFID tags 1–5 are then commanded by the locator unit 6 to reply again using one of the secondary channels $G_0$ through $G_{15}$, which channel is assigned using a first portion of each RFID tag's unique serial identification number.

For example, RFID tag 1 has a serial number of 1101-0010-0011-1101-0001-1111-1011-1010 (13-02-03-13-01-15-11-10). RFID tag 2 has a serial number of 1010-0000-1111-1101-0010-1101-0010-0011 (10-00-15-13-02-13-02-03). RFID tag 3 has a serial number of 0011-1111-0000-0101-1101-0001-1111-1011 (03-15-00-05-13-01-15-11). RFID tag 4 has a serial number of 0000-00001110-0001-1101-0010-0011-1101 (00-00-14-01-13-02-03-13). serial number of 1101-0000-1111-0010-0001-1111-1010-0111 (13-00-15-02-0115-10-07). As can be seen, any two of these RFIDs includes one 4- bit portion that is unique.

In this case, RFID tag 1 is commanded to reply in secondary communications channel $G_{13}$, RFID tag 2 is commanded to reply in secondary communications channel $G_{10}$, RFID tag 3 is commanded to reply in secondary communications channel $G_{03}$, RFID tag 4 is commanded to reply in secondary communications channel $G_{00}$, and RFID tag 5 is commanded to reply in secondary communications channel $G_{13}$.

As '00' designates the primary communications channel, RFID tag 4 actually replies in secondary communications channel $C_{16}$ as this channel is not designated by any other 4-bit portion. Alternatively, each channel could add one to the 4-bit designation, so that 0000 would designate channel $C_{00}$, and 1111 would designate channel $C_{16}$.

Continuing with the example, channel $C_{00}$ includes one signal from RFID tag 4, channel $C_{03}$ includes one signal from RFID tag 3, channel $C_{10}$ includes one signal from RFID tag 2, and channel $C_{13}$ includes two signal from RFID tags 1 and 5.

The locator unit 6 then reads the identification numbers from RFID tags 2, 3 and 4, as these can be read because there are no RF collisions in their secondary communications channels. Alternatively, the locator unit 6 assigns RFID tags 2, 3 and 4 one of a third group of channels, different than the primary and secondary channels. This third group of channels is used to read all responding RFID tags consecutively.

The locator unit 6 then transmits a command to those RFID tags in channel $C_{13}$ to transmit in another secondary communications channel using a different portion of their serial number. The next portion of their serial number may be used, or the previous portion, or a randomly selected portion, or some combination of bits of their serial number. RFID tag 1 then transmits a reply in secondary communications channel $C_{02}$ and RFID tag 5 transmits a reply in secondary communications channel $C_{16}$ (or $C_{00}$, depending on the channel numbering protocol).

Once these replies have been received, the locator unit knows the serial numbers of all the RFID tags in the proximity. The locator unit 6 then transmits a command to each of the RFID tags in the proximity assigning them unique communications channels in the third group of communications channels, which are distinct from the secondary communications channels. The RFID tags in the proximity then transmit the desired information in their assigned unique communications channels, which is then received by the locator unit without error due to RF collisions.

While this process required four transmissions and four replies to obtain the desired information, each transmission and reply required very little information and relatively simple processing at the RFID tags. Consequently, the present invention can be manufactured to be highly reliable using a few parts, thereby decreasing the probability of failure.

Alternative Embodiment

Another embodiment of a method according to the present invention is depicted in FIGS. 2–8. In this example, the following steps are taken to sort and identify four markers or RFID tags at varying distances from the locator or reader. Marker (1) returned a strong RF signal and was identified without errors. Similarly, marker (2) was identified successfully in the absence of marker (1). Markers (3) and (4) returned RF signals of substantially equal magnitude and thus collided. Therefore, sorting markers (3) and (4) becomes necessary.

During the sorting mode, all markers in channel groups G0 and G1 respond to a read only with an acknowledgment (ACK) signal and only during a one bit equivalent time. At all other times, there is no response from a marker to prevent causing interference with another marker being received during that time.

In a polling mode, the markers in channel groups G0 and G1 respond with a full read byte during their allocated time slot.

Communication in the primary channel is about 8-bits long, i.e., channel Group G0 starts after 8 bits of time. Read commands are aborted when a new command is received, i.e., the timers are reset and the transmission is halted.

The anti-collision algorithm performs sorting by the following steps:

A. Referring to FIG. 2, all markers are read simultaneously in the primary channel (P) 21. In this example, the locator attempts to read markers (1), (2), (3) and (4) all at once. Communication occurs in the primary communications channel (P) 21, in which there is no delay. On reset, all markers are set to respond in the primary channel (P) 21, thereby enabling a response in the primary channel upon first being interrogated.

B. Referring to FIG. 3, in this step, markers (1) and (2) are assigned to a third group of channels 27–31 delayed from the primary channel (P) 21. In this example, marker (1) is assigned channel G1 27 in slot "0" of the third group of channels, and marker (2) is assigned channel G1 28 in slot "1" of the third group of channels. Marker (1) had the strongest signal and was read successfully and sent to channel group G1, slot "0" 27. Marker (2) was then read successfully and sent to channel group G1, slot "1" 28. Markers (3) and (4) could not be read as they interfered with each other.

Channel group G1 is delayed from the primary channel P 21 by 16 though 32 delay slots. When the markers (1)–(4) are interrogated, in this configuration, they respond with a single bit acknowledgment during their assigned time slots.

C. Referring to FIG. 4, next, the collided markers are assigned to a particular channel in the first group of secondary channels G0, e.g., slot "0" of channel group G0 22, for sorting.

D. Referring to FIG. 5, the markers in the channel group G0, slot "0" 22 are sorted based on a selected 4-bit nibble over slots 0–15 of the first secondary channel group G0 22–26. So, marker (3) is assigned slot "3" 23 and marker (4) is assigned slot "4" 24 in group G0.

E. Referring to FIG. 6, the markers are interrogated to read acknowledgments to determine the occupied slots in channel group G0.

F. Referring to FIG. 7, marker (3) is moved from the channel group G0 slot "3" 23 to the primary channel to identify the marker.

G. Referring to FIG. 8, marker (3) is identified and moved to channel group G1, slot "3" 29. Step F is then repeated until marker (4) is identified and moved to a channel slot in channel group G1 that is not occupied.

In one exemplary embodiment of the number used to sort the markers, the number is a 4-bit nibble of an 8 byte memory page. This 64-bit memory may contain a unique serial number plus other identifying information, such as marker type, sub-type, utility, frequency, owner, etc.

Markers that have an equal value in the selected nibble for sorting will continue to collide until a nibble is selected that is different for each colliding marker. As each marker has a unique number code, the markers will eventually sort into different bins and thus be identified. The capability of addressing a group of markers and changing their time slots and sorting them based on a unique number enables sorting and identification of a large number of markers or tags.

Exemplary Embodiment of ID Marker

Figure 9:
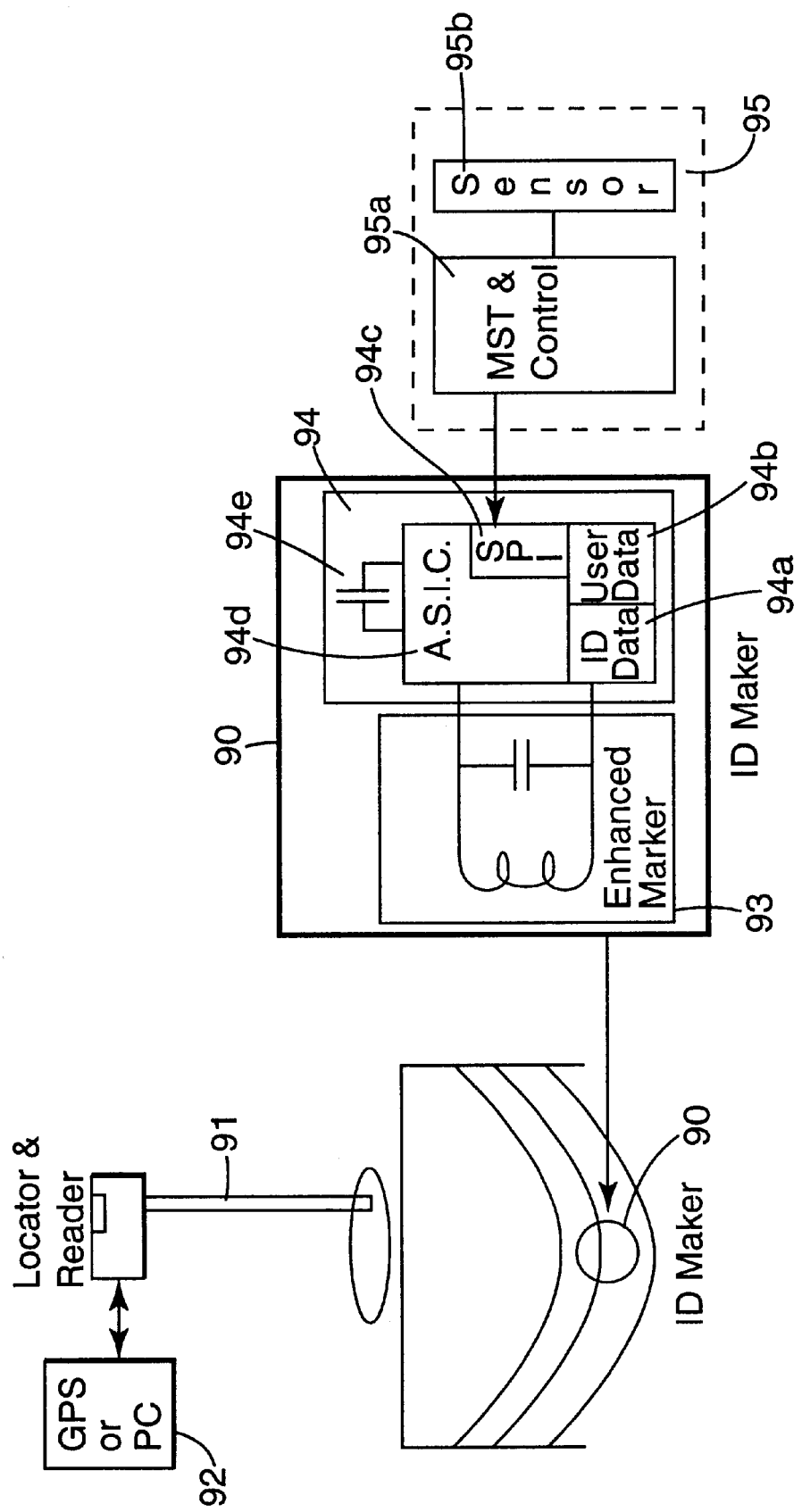
FIG. 9 depicts an exemplary embodiment of an apparatus according to the present invention.

Turning to FIG. 9, shown therein is a block diagram of an ID marker for use in the above exemplary methods. The ID marker 90 receives a signal from locator and reader 91, which in turn is couplable to a personal computer or global positioning system 92. The signals received from the locator and reader unit 91 are radio-frequency signals that excite an inductor-capacitor network 93, which modulates the signal transmitted by the reader unit with information provided by a processing portion 94 of the marker 90.

The processing portion 94 includes an application specific integrated circuit 94*d*, an identification data storage 94*a*, a user data storage 94*b* and a system programming interface 94*c* and a power supply 94*e*. The system programming interface 94*c* is couplable to an external device 95, which includes a test and control segment 95*a* and a sensor 95*b*.

The identification data storage stores the number available to the ID marker 90 for use in determining which channel to move to during the sorting process. This may include a unique serial number assigned to the ID marker 90 during the manufacturing process. User data stored in the ID marker 90 can be combined with the ID data to form an overall number from which portions are chosen during the sorting process, as described above.

The above exemplary embodiment has been described with respect to primary and secondary communications channels that are distinguishable from each other based on a time multiplexing scheme. Other channel differentiations are possible, such as frequency, codeword, or various combinations of time, frequency and codeword can be used to create channels that can be distinguished from one another, and which can be selected based on a unique number assigned to each marker.

While the present invention has been described with respect to an exemplary embodiment, the scope of the invention is defined by the following claims.

What is claimed is:

1. A method for communicating with a plurality of buried transmitters, comprising the steps of:
    a) transmitting an interrogation signal requesting all buried transmitters receiving the interrogation signal to respond in a primary channel;
    b) assigning each buried transmitter whose reply signal is successfully received a unique dedicated channel in a first group of channels;
    c) assigning all buried transmitters whose reply signal is not successfully received to a first channel in a second group of channels;
    d) commanding all buried transmitters currently assigned to the first channel in the second group of channels to move to one of the channels in the second group of channels based on a portion of a number available to each of the buried transmitters;
    e) detecting an acknowledgment from each buried transmitter indicating which channels among the first and second groups of channels are occupied;
    f) commanding, one by one, those buried transmitters assigned to each of the channels in the second group of channels in step d) to transmit a signal in the primary channel;
    g) commanding those buried transmitters whose signals are successfully received in step f) to move to a unique dedicated channel in the first group of channels; and
    h) repeating steps c) through g) until all buried transmitters are assigned a unique dedicated channel in the first group of channels.

2. The method according to claim 1, wherein the portion of the number available to each of the plurality of buried transmitter includes a portion of a number formed from one or more of the following: a unique serial number, marker type, sub-type, utility, frequency, owner, and time-of-day.

3. The method according to claim 1, further comprising the step of polling each of the plurality of buried transmitters assigned to a dedicated channel using a single command and sequentially receiving, in response to the polling request, data from each of the plurality of buried transmitters in a dedicated channel.

4. The method according to claim 1, wherein each of the plurality of first and second groups of channels is delayed from the primary channel by a predetermined amount of time.

5. The method according to claim 1, wherein each of the channels in the first and second groups of channels is assigned a unique time-frequency space relative to the primary communications channel and all other channels in the first and second groups of channels.

6. The method according to claim 1, wherein each of the channels in the first and second groups of channels is assigned a unique time-frequency-codeword space relative to the primary communications channel and all other channels in the first and second groups of channels.

7. A method for communicating between a single transmitter and a reader unit attempting to communicate with a plurality of other transmitters, comprising the steps of:
    a) receiving an interrogation signal requesting any transmitter receiving the interrogation signal to respond in a primary channel;
    b) transmitting a reply signal to in response to the interrogation signal received in step a);
    c) moving, in response to a second signal from the reader indicating that the transmitted reply signal in step b) was successfully received, to a unique dedicated channel in a first group of channels;
    d) moving upon lack of receipt of a second signal from the reader indicating that the transmitted reply signal in step b) was successfully received, to a first channel in a second group of channels;
    e) moving, upon receipt of a command to all transmitters currently assigned to the first channel in the second group of channels, to one of the channels in the second group of channels based on a portion of a number available to the single transmitter;
    f) transmitting, upon receipt of a command from the reader unit to any transmitter assigned to said one of the channels in the second group of channels, a signal in the primary channel;
    g) moving, upon receipt of a signal from the reader that the signal transmitted in step f) in the primary channel was successfully received, to a unique dedicated channel in the first group of channels; and
    h) repeating steps d) through f) using a different portion of the number available to the single transmitter in step e) until receiving a signal from the reader indicating that the signal transmitted in step f) was successfully received.

8. The method according to claim 7, wherein the portion of the number available to the single transmitter includes a portion of a number formed from one or more of the following: a unique serial number, marker type, sub-type, utility, frequency, owner, and time-of-day.

9. A method for communicating between a reader unit and a plurality of transmitters, comprising the steps of:
    a) transmitting an interrogation signal requesting all transmitters receiving the interrogation signal to respond in a primary channel;
    b) commanding each responding transmitter whose reply signal is successfully received to transmit further transmissions in a unique dedicated channel in a first group of channels;
    c) commanding all other transmitters to transmit further transmissions in one channel in a second group of channels based on a portion of a number available to each of said all other transmitters;

d) commanding all transmitters assigned in step c) to each channel in the second group of channels, one channel at a time, to transmit an identification signal in the primary channel;

e) commanding those transmitters whose identification signal is successfully received in step d) to transmit further transmissions in a unique dedicated channel in the first group of channels; and f) repeating steps c) through e) until all transmitters are assigned a unique dedicated channel in the first group of channels.

10. A method for communicating between a single transmitter and a reader unit attempting to communicate with a plurality of other transmitters, comprising the steps of:

a) receiving an interrogation signal requesting any transmitter receiving the interrogation signal to respond in a primary channel;

b) transmitting a reply signal to in response to the interrogation signal received in step a);

c) moving, in response to a second signal from the reader indicating that the transmitted reply signal in step b) was successfully received, to a unique dedicated channel in a first group of channels;

d) moving upon lack of receipt of a second signal from the reader indicating that the transmitted reply signal in step b) was successfully received, to one of the channels in the second group of channels based on a portion of a number available to the single transmitter;

e) transmitting, upon receipt of a command from the reader unit to any transmitter assigned to said one of the channels in the second group of channels, an identification signal in the primary channel;

f) moving, upon receipt of another signal from the reader that the identification signal transmitted in step e) was successfully received, to a unique dedicated channel in the first group of channels; and g) repeating steps d) through e) using a different portion of the number available to the single transmitter in step d) until receiving a signal from the reader indicating that the signal transmitted in step e) was successfully received.

11. An apparatus for marking a utility line and for communicating with a reader unit attempting to communicate with a plurality of other similar apparatuses comprising:

an inductor-capacitor network modulating an interrogation signal received from the reader unit and reflecting a modulated reply signal;

a memory storing a number assigned to the apparatus as an identification number;

a processor coupled to the inductor-capacitor network and memory, wherein said processor is programmed to:

a) move, in response to a second signal from the reader indicating that the reply signal was successfully received, to a unique dedicated channel in a first group of channels;

b) move, upon lack of receipt of a second signal from the reader indicating that the reply signal was successfully received, to a first channel in a second group of channels;

c) move, upon receipt of a command to all apparatuses currently assigned to the first channel in the second group of channels, to one of the channels in the second group of channels based on a portion of a number stored in the memory;

d) transmit, upon receipt of a command from the reader unit to any transmitter assigned to said one of the channels in the second group of channels, a signal in the primary channel;

e) move, upon receipt of a signal from the reader that the signal transmitted in step d) in the primary channel was successfully received, to a unique dedicated channel in the first group of channels; and f) repeat steps b) through e) using a different portion of the number stored in memory in step c) until receiving a signal from the reader indicating that the signal transmitted in step d) was successfully received.

* * * * *

UNITED STATES PATENT AND TRADEMARK OFFICE
CERTIFICATE OF CORRECTION

PATENT NO.     : 6,377,203 B1                                   Page 1 of 1
DATED          : April 23, 2002
INVENTOR(S)    : Doany, Ziyad H.

It is certified that error appears in the above-identified patent and that said Letters Patent is hereby corrected as shown below:

Column 6,
Line 54, after ")." insert -- RFID tag 5 has a --.
Line 56, "-0115-" should read -- -01-15- --.

Signed and Sealed this

Eleventh Day of February, 2003

JAMES E. ROGAN
*Director of the United States Patent and Trademark Office*